C. A. LEE.
SEED CLEANER.
APPLICATION FILED MAR. 13, 1913.

1,109,428.

Patented Sept. 1, 1914.
4 SHEETS—SHEET 1.

Inventor
Clifford A. Lee.

C. A. LEE.
SEED CLEANER.
APPLICATION FILED MAR. 13, 1913.

1,109,428.

Patented Sept. 1, 1914.
4 SHEETS—SHEET 3.

Witnesses

Inventor
Clifford A. Lee.
By
Attorneys.

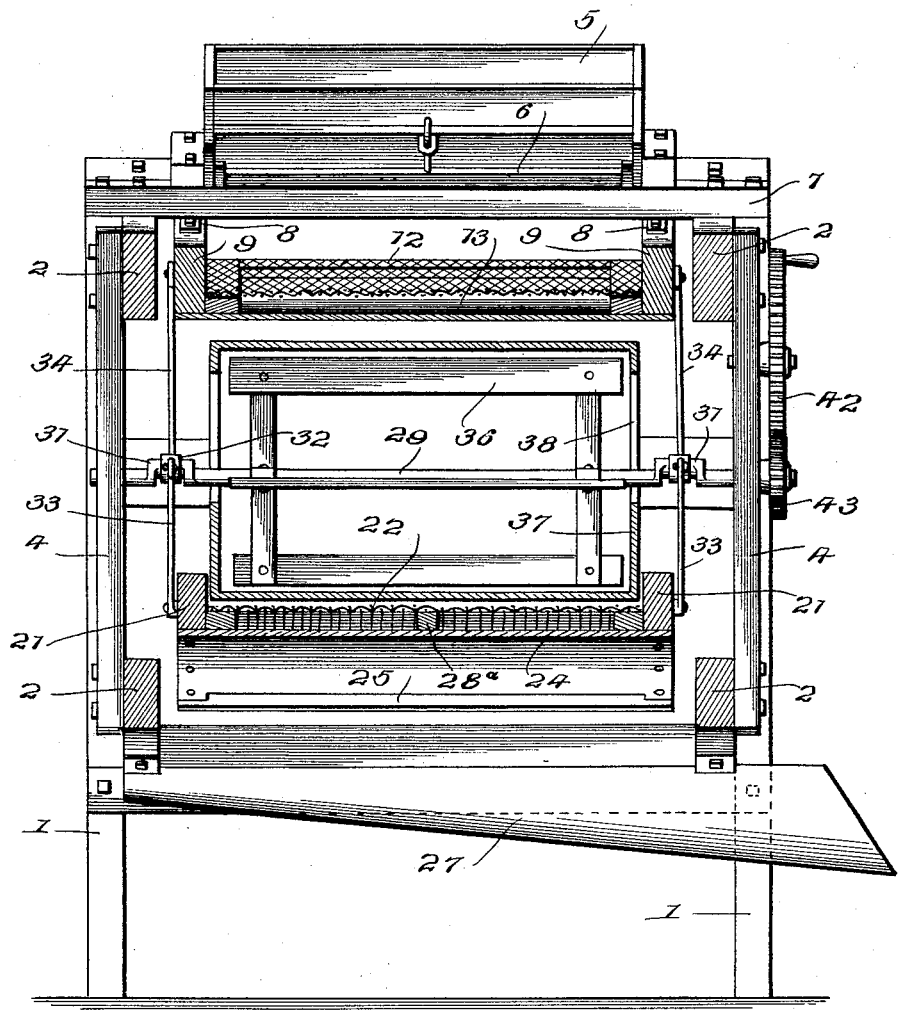

UNITED STATES PATENT OFFICE.

CLIFFORD A. LEE, OF MORRIS, MINNESOTA.

SEED-CLEANER.

1,109,428. Specification of Letters Patent. Patented Sept. 1, 1914.

Application filed March 13, 1913. Serial No. 754,052.

*To all whom it may concern:*

Be it known that I, CLIFFORD A. LEE, a citizen of the United States, residing at Morris, in the county of Stevens and State of Minnesota, have invented certain new and useful Improvements in Seed-Cleaners, of which the following is a specification.

This invention relates to seed cleaners, and has for its object the provision of a simple and efficient apparatus by the use of which barley, wheat or other valuable seeds may be separated from and cleaned of wild oat seeds, garlic, and other seeds which if planted with the desirable seeds would depreciate the value of the crop.

One object of the invention is to provide simple and efficient means whereby the seeds may be freed of any straw or other rubbish which may have been gathered therewith, and a further object of the invention is to provide a seed cleaner in which the seeds will be automatically separated and graded according to their quality.

A further object of the invention is to provide simple and efficient means by which the clogging of the screens by the seeds will be prevented, and, finally, the object of the invention is to simplify the arrangement and operation of the parts of a seed separator and cleaner to the end that the efficiency and durability of the same may be increased.

The invention is illustrated in the accompanying drawings and consists in certain novel features which will be hereinafter first fully described and then more particularly pointed out in the appended claims.

Figure 1:
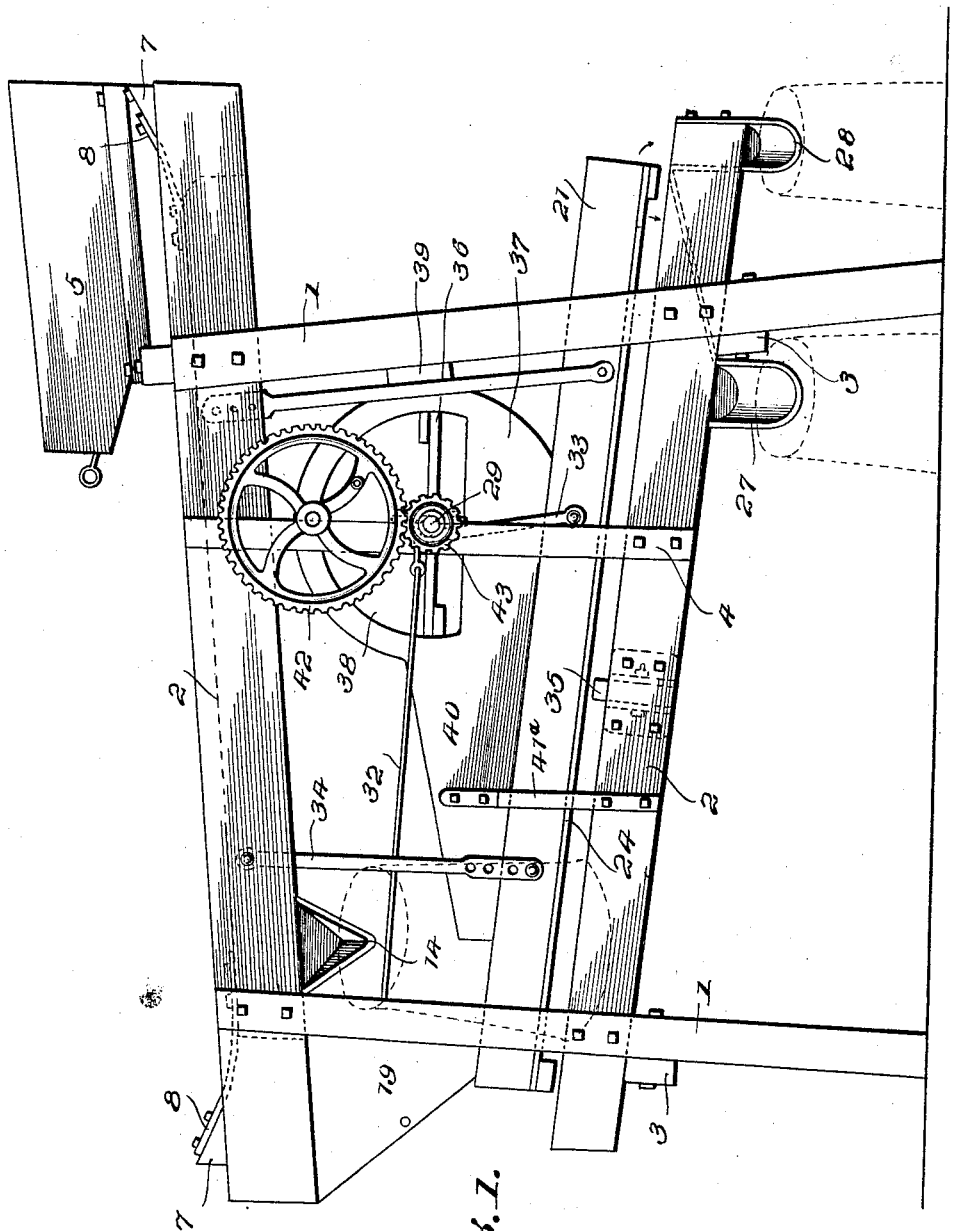
Figure 2:
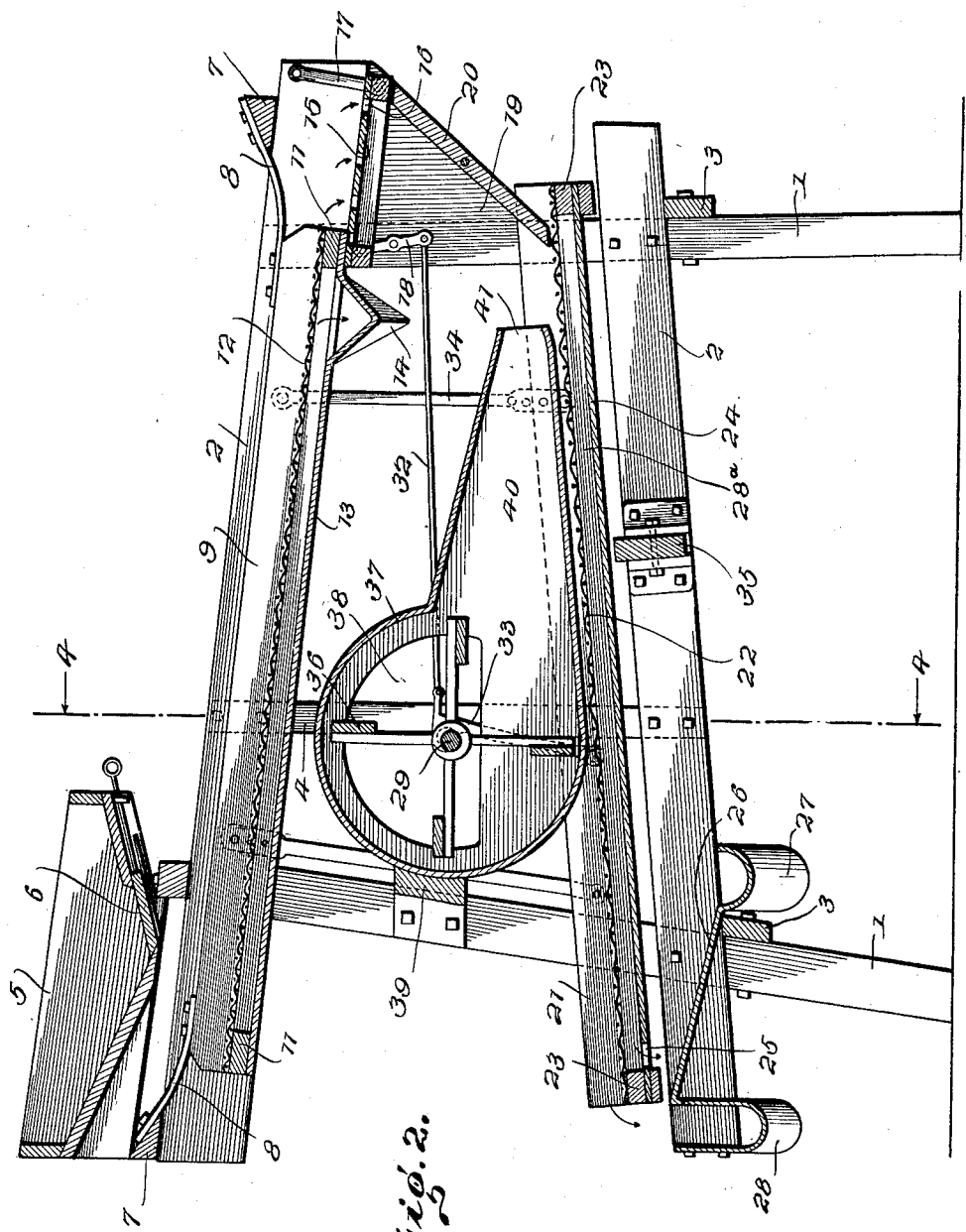
Figure 3:
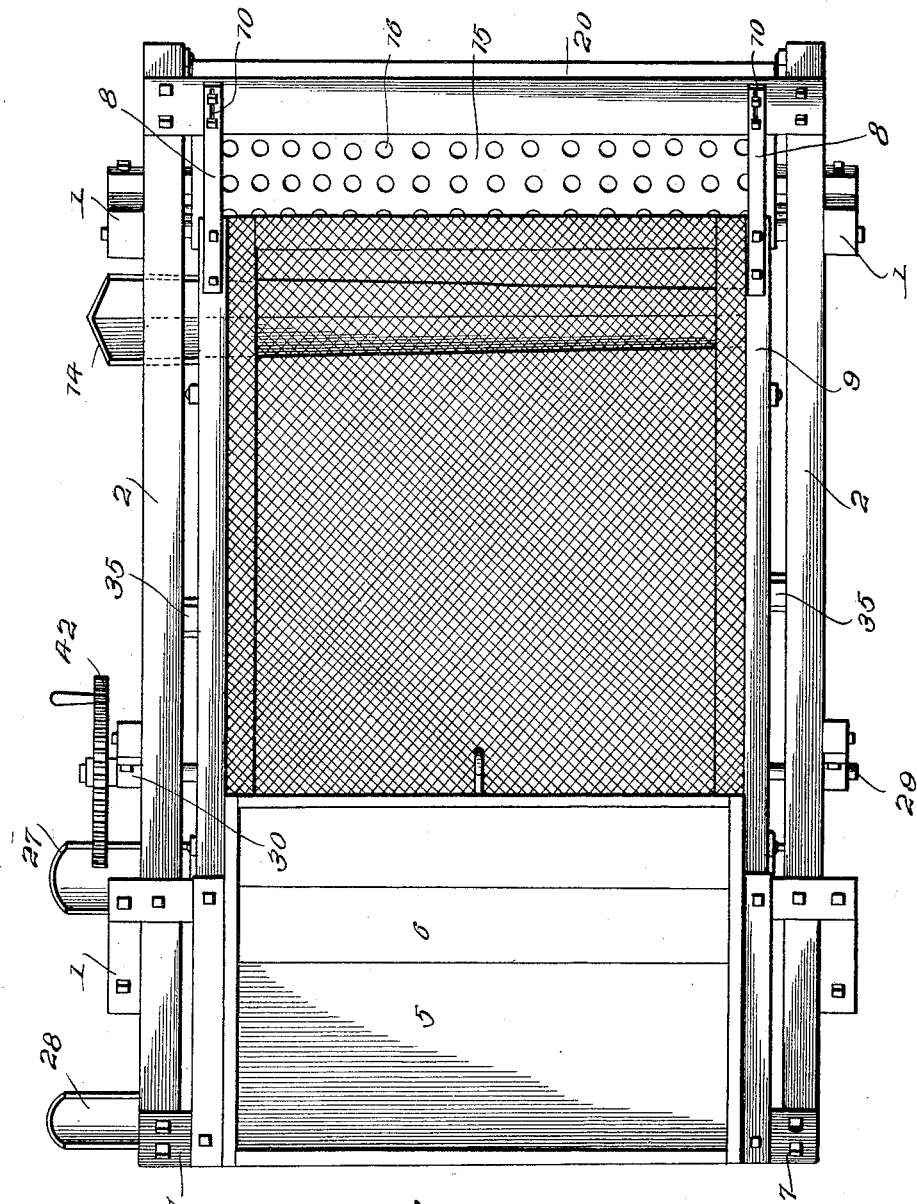

In the drawings: Figure 1 is a side view of a seed cleaner embodying my invention; Fig. 2 is a vertical longitudinal section of the same; Fig. 3 is a plan view; Fig. 4 is a transverse vertical section taken substantially in the plane of the driving shaft as indicated by the line 4—4 in Fig. 2.

In carrying out my invention, I employ a supporting frame consisting of legs or posts 1 and longitudinal beams 2 secured thereto, cross bars or beams 3 being secured to the posts so as to brace the structure, and standards 4 being secured to the sills or longitudinal beams 2 to furnish supports for the bearings in which the driving shaft is journaled.

The upper and lower beams 2 are inclined in opposite directions and upon the upper ends of the upper beams is secured a hopper 5 which may be of any preferred construction and is equipped with an adjustable cut-off 6 so as to regulate the flow of seed from the hopper to the upper screen. Cross bars 7 are secured upon and extend between the upper side bars 2 at the ends thereof, and to these cross bars are secured straps or brackets 8 which support the upper screen 9. These straps or brackets 8 are formed with longitudinal slots 10 through which the securing bolts are inserted into the cross bars and which accommodate the movement of the straps when the apparatus is in use so that the vibration of the screens will not tend to break or otherwise destroy the straps. The inner ends of the straps or brackets are secured directly to the upper edges of the side bars of the screen frame and cross bars 11 extend between the said side bars at the ends thereof, the screen 12 being secured directly upon the said cross bars, as clearly shown. The screen may be of any preferred or convenient construction and is preferably in the form of wire netting of the proper mesh to accomplish the desired result. An imperforate bottom or pan 13 is secured to the under sides of the cross bars 11 and the lower edges of the side bars of the screen, and at its lower end the said bottom or pan is provided with a transverse trough or discharge spout 14 which leads laterally to one side of the main supporting frame so as to discharge the wild oats and other undesirable seed into a suitable receptacle which may be hung upon the frame or placed upon the floor of the room below the spout.

The upper side bars 2 are extended beyond the rear end of the screen, and at the lower edges of these extended portions of the said side bars is provided a straw-supporting screen 15 which is preferably in the form of a metallic plate having large perforations 16 therethrough, as shown. This straw-supporting screen is supported at its rear or outer edge by links 17 which are pivoted at their lower ends to the ends of the screen and at their upper ends to the extended portions of the side bars. The front edges of the said screen is supported by links or vibratory arms 18 which are pivoted between their ends to the main frame and have their upper ends pivoted to the screen, as shown most clearly in Fig. 2. Below the screen 15 side plates 19 are provided and extend from the lower edges of the side bars 2 to the adjacent posts 1 so that the air blast directed against the under side of the screen 15 will be prevented from blowing the good seed away from the apparatus. A deflecting plate 20 is pivotally mounted in and extends between these side plates 19 and may be adjusted to a greater or lesser angle according to the strength of the blast directed against the screen 15 and the weight of the material passing therethrough.

A lower screen is arranged just above the lower side bars 2 and this screen consists of side bars or rails 21, a foraminous plate 22 secured at its ends to cross bars 23 extending between the ends of the side bars or rails 21, and an imperforate plate or bottom 24 secured to the lower edge of the said side bars. The foraminous plate 22 may be of any desired form but will preferably be of wire netting of a larger or wider mesh than the upper screen 12. The imperforate bottom plate 24 terminates short of the front end of the screen, thereby providing an opening 25 through which the second grade seeds may pass onto a deflector or guide plate 26 by which they are directed into a trough 27 disposed transversely of the frame so as to discharge into any convenient receptacle. The deflector 26 and the trough 27 are carried by the lower side bars 2 and at the front end of the deflector is a trough or discharge chute 28 which receives the first grade seeds passing over the front end of the screen 22, as will be readily understood. A bar or other support 28a may be placed below the screen to prevent sagging of the same.

The driving shaft 29 is mounted in bearings 30 secured upon the standards 4 and has cranked portions 31 near its ends to which are connected pitmen or rods 32 which have their rear ends pivoted to the lower ends of the links 18 so that, as the driving shaft rotates, the cranked portions thereof will impart a vibratory movement to the screen 15. Hangers 33 are also pivotally mounted upon the cranked portions of the driving shaft and have their lower ends pivoted to the lower screen so that the rotation of the shaft will impart an up and down or vertical reciprocatory movement to the lower screen, and connecting rods or links 34 are secured to the sides of the upper and lower screens so that the movement of the lower screen will be imparted directly to the upper screen and the two screens vibrated in unison. The links or connecting rods 34 are adjustably attached to the screens so that the inclination of the screens may be varied as desired. A cross bar 35 is secured to and extends between the lower side bars and constitutes a bumper, being adjustable vertically so that on the down stroke of the lower screen the bottom thereof will be brought against this bumper and the seeds, consequently, jarred or shaken so that clogging of the screen cannot occur.

Between the cranked portions of the driving shaft, fan blades 36 are secured rigidly thereto and radiate therefrom and around the said fan blades is provided a casing 37 having openings 38 in its sides to permit air to be drawn into the casing therethrough. This casing is supported in proper position by being secured directly to a transverse beam 39 forming a part of the main frame and from the casing a discharge spout 40 extends longitudinally between the two screens toward the rear thereof so that the blast issuing from the discharge end 41 of the same will be directed upon the deflector 20 and thence turned against the bottom of the screen 15 through which it passes so that the straw, chaff, and other light dirt will be blown from the rear end of the apparatus. Brackets 41a are secured to the sides of the spout and to the main frame to support the same and prevent it dropping onto the screen.

It is thought the operation of the machine will be readily understood from the foregoing description taken in connection with the accompanying drawings. The seed to be cleaned is placed in the hopper 5 and the cut-off 6 adjusted so as to permit the same to flow in a stream onto the upper screen, after which motion is imparted to the driving shaft by a driving gear wheel 42 meshing with a pinion 43 on the end of the driving shaft, as will be readily understood. The rotation of the driving shaft will cause the fan blades to rotate rapidly so as to draw air into the casing 37 and expel the same in a strong blast through the nozzle or mouth 41 in said casing, as previously stated. The cranked portion of the driving shaft will impart a vibratory movement to the lower screen through the hangers 33 and to the screen 15 through the pitman 32 and the links 18. The movement of the lower screen will be transmitted through the links 34 to the upper screen so that said screen will be shaken and the material deposited thereon caused to flow slowly toward the rear end of the same. The smaller seeds, such as wild oats and the undeveloped seeds, will drop through the said screen onto the pan 13 and will flow down said pan into the trough 14 through which they will escape to the bag or other receptacle provided therefor. The straw and large seeds will pass over the rear end of the screen 12 onto the screen 15 and the straw and large pieces of rubbish will be caught by said screen and blown therefrom by the air blast, as will be readily understood, while the vibration of said screen will cause the good seeds to work to and through the perforations of the screen and thence pass over the deflector 20 onto the lower screen 22. The vibration of this screen will cause the seeds to travel over the same toward the front end thereof and the smaller seeds will drop through the screen onto the bottom plate or pan 24 and escape from the same through the opening 25 onto the deflector 26 and thence pass into the trough or chute 27. The larger first grade seeds will pass over the front end of the screen and drop into the trough or chute 28 from which they will pass into any suitable receptacle. It will thus be seen that the seeds are very quickly and completely freed from all foreign matter and that the good seeds are automatically graded. The vibration of the lower screen will cause the bottom thereof to impinge against the bumper 35, as before stated, and the said bumper is adjustable in its supports so that it may be easily raised to compensate for wear and also to attain the proper agitation of the seeds.

It will be noted that the machine is free of all complicated gearing or intricate arrangements of its parts and that the fan is disposed between the the screens so that the air blast will be directed to the point where it may be most efficiently utilized and also that the screens are visible and accessible at all times so that the progress of the seed sorting and cleaning operations may be constantly noted.

What I claim is:—

1. An apparatus for the purpose set forth comprising a main frame, an inclined screen suspended upon the frame, a fan-shaft below said screen, a separator disposed adjacent the lower end of said screen, links pivoted at their upper ends upon the main frame and at their lower ends to the outer edge of said separator, a link pivoted upon the frame below said separator and having its upper end pivoted to the bottom of said separator near the inner edge thereof, and a pitman pivoted at its outer end to the lower end of said link and having its inner end connected to the fan-shaft whereby the pitman will be reciprocated by said shaft.

2. In an apparatus for the purpose set forth, the combination of a main frame, a screen slidably supported upon the top of the main frame, a separator disposed adjacent the rear end of said screen, a lower screen disposed within the main frame and suspended from the upper screen, a deflector pivoted within the main frame and extending from the outer rear end of the separator to the outer rear end of the lower screen, a fan-casing supported within the main frame between the screen and having its outlet directed toward said deflector, a fan within said casing, a crank shaft extending transversely through said casing and carrying said fan, a pitman connecting said shaft with the separator, hangers fitted upon said shaft and depending therefrom and secured to the lower screen, and means for rotating said shaft.

In testimony whereof I affix my signature in presence of two witnesses.

CLIFFORD A. LEE. [L. S.]

Witnesses:
F. R. PUTNAM,
J. C. McCONVILLE.